(12) United States Patent
Nakatani et al.

(10) Patent No.: US 7,542,663 B2
(45) Date of Patent: Jun. 2, 2009

(54) OPTICAL DISC RECORDING APPARATUS, OPTICAL DISC REPRODUCTION APPARATUS, AND OPTICAL DISC RECORDING METHOD THAT ARE ALL SUITABLE FOR SEAMLESS REPRODUCTION

(75) Inventors: Tokuo Nakatani, Ibaraki (JP); Hideaki Harumoto, Moriguchi (JP); Kazuhiko Nakamura, Hirakata (JP); Tomoyuki Okada, Edinburgh (GB)

(73) Assignee: Panasonic Corporation, Osaka (JP)

( * ) Notice: Subject to any disclaimer, the term of this patent is extended or adjusted under 35 U.S.C. 154(b) by 805 days.

(21) Appl. No.: 10/887,864

(22) Filed: Jul. 12, 2004

(65) Prior Publication Data

US 2004/0247296 A1 Dec. 9, 2004

Related U.S. Application Data

(62) Division of application No. 09/666,056, filed on Sep. 20, 2000, now Pat. No. 6,782,193.

(30) Foreign Application Priority Data

Sep. 20, 1999 (JP) ................................. 11-265574

(51) Int. Cl.
H04N 5/76 (2006.01)
(52) U.S. Cl. ..................................................... 386/126
(58) Field of Classification Search .................. 386/46, 386/95, 98, 111, 112, 125, 126
See application file for complete search history.

(56) References Cited

U.S. PATENT DOCUMENTS

| 5,923,869 | A | | 7/1999 | Kashiwagi et al. |
| 5,937,138 | A | * | 8/1999 | Fukuda et al. ............. 386/112 |
| 5,966,352 | A | | 10/1999 | Sawabe et al. |
| 6,181,870 | B1 | | 1/2001 | Okada et al. |

(Continued)

FOREIGN PATENT DOCUMENTS

EP 0 888 018 12/1998

(Continued)

*Primary Examiner*—David E Harvey
(74) *Attorney, Agent, or Firm*—Wenderoth, Lind & Ponack, L.L.P.

(57) ABSTRACT

An optical disc recording apparatus including: a receiving unit operable to receive designations from a user, the designations including a recording start designation, a recording end designation, a pause designation, and a pause release designation; an encoding unit operable to generate one video object by compressing audio and video data for a period starting when the receiving unit receives the recording start designation or the pause release designation and ending when the receiving unit receives the pause designation or the recording end designation, where if the receiving unit receives the pause release designation, a video object is generated so that the video object is capable of being seamlessly reproduced with an immediately preceding video object in a reproduction apparatus; a generation unit operable to generate a seamless flag each time a video object is generated, the seamless flag showing whether the video object corresponding to the seamless flag is capable of being seamlessly reproduced with an immediately preceding video object in the reproduction apparatus; and a recording unit operable to record, onto an optical disc, each video object generated by the encoding unit and each seamless flag generated by the generation unit.

5 Claims, 10 Drawing Sheets

U.S. PATENT DOCUMENTS 6,466,732 B1 * 10/2002 Kimura et al. ................ 386/52
6,577,805 B1 *  6/2003 Hirai ........................... 386/46
6,625,386 B1 *  9/2003 Kim et al. .................... 386/52
6,782,193 B1 *  8/2004 Nakatani et al. ............ 386/126

FOREIGN PATENT DOCUMENTS

| | | | |
|---|---|---|---|
| EP | 0 903 743 | | 3/1999 |
| EP | 0 903 744 | | 3/1999 |
| EP | 0903738 | * | 3/1999 |
| WO | 99/46939 | | 9/1999 |

* cited by examiner

OPTICAL DISC RECORDING APPARATUS, OPTICAL DISC REPRODUCTION APPARATUS, AND OPTICAL DISC RECORDING METHOD THAT ARE ALL SUITABLE FOR SEAMLESS REPRODUCTION

This is a Divisional application of U.S. application Ser. No. 09/666,056, filed Sep. 20, 2000 now U.S. Pat. No. 6,782,193.

BACKGROUND OF THE INVENTION

1. Field of the Invention

The present invention relates to a rewritable optical disc, and a recording method and a reproduction method for the optical disc. The present invention in particular relates to an optical disc recording apparatus and an optical disc recording method which each record video objects (compressed audio and video data) so that the seamless reproduction of the video objects is possible even if a pause operation was designated by a user during recording, and an optical disc apparatus for the optical disc recording apparatus and the optical disc recording method.

2. Background Art

In recent years, optical discs with a capacity of several gigabytes, such as DVD-RAMs (digital video disc-random access memories), have appeared in the field of rewritable optical discs that had formerly been limited to a capacity of 650 MB.

It is expected that such optical discs will become the principal media for recording AV (audio-visual) data as well as computer data. That is, it is believed that optical discs and recording and reproduction apparatuses for the optical discs (hereinafter abbreviated to the "optical disc apparatuses") will replace magnetic tapes and VCRs (videocassette recorders) that have conventionally been the major AV data recording media and AV data recording apparatuses.

The operation of an optical disc apparatus used instead of a stationary VCR is described below. The optical disc apparatus receives television signals of a broadcast, converts the signals into a video object, and records the video object onto an optical disc. More specifically, the optical disc apparatus generates compressed video data (a video elementary stream) and compressed audio data (an audio elementary stream) from the television signals, divides the compressed video data into video packs of a fixed length, and divides the compressed audio data into audio packs of a fixed length. Then the optical disc apparatus interleaves the video packs and audio packs and records the interleaved packs onto optical discs as a video object. Here, the video elementary stream and the audio elementary stream are generated according to an MPEG standard (ISO/IEC13818).

The optical disc apparatus usually generates one video object in each recording operation if a pause operation (the temporary halt of recording) is not designated during the recording operation. That is, if no pause operation is designated during recording, the optical disc apparatus generates and records one video object for the period between the time when a user designates the start of recording and the time when the user designates the end of recording.

If a pause operation is designated during recording, a problem arises in the optical disc apparatus. That is, it becomes difficult for the optical disc apparatus to seamlessly reproduce video objects generated before and after a pause operation.

If one video object is generated by each successive recording operation, the optical disc apparatus completes the generation and recording of a current video object on receiving a pause designation and starts to generate and record a new video object on receiving a pause release designation. That is, one video object is generated and recorded for each of the period between a designation of recording start and a pause designation, the period between a pause release designation and the next pause designation, and the period between a pause release designation and a designation of recording end.

If a video object recorded until a pause designation and a video object recorded after a pause release designation are sequentially reproduced, the optical disc apparatus cannot guarantee the seamless reproduction of these video objects and the following problems may occur.

To prevent overflows and underflows of video elementary streams in the video input buffer of a reproduction apparatus, the optical disc apparatus assumes the video input buffer and carries out a simulation to determine the size of data accumulated in the video input buffer during the encoding of video data. Similarly, during the encoding of audio data, the optical disc apparatus assumes an audio input buffer and carries out a simulation to determine the size of data accumulated in the audio input buffer. Although this guarantees that each video object can be seamlessly reproduced by itself, an overflow and underflow may occur in the reproduction apparatus at the boundary between a video object recorded until a pause designation and that recorded after a pause release designation.

Also, each audio elementary stream includes a plurality of audio frames (each audio frame is of 32 ms, for instance). If separate video objects are generated as a result of a pause operation, noise (electric noise) may occur at the boundary between these video objects because the audio frame at the boundary includes audio data having no correlation.

SUMMARY OF THE INVENTION

The first object of the present invention is to provide an optical disc recording apparatus and an optical disc recording method which each records video objects in real time before and after a pause operation so that the seamless reproduction of these video objects is achieved without difficulty, and an optical disc reproduction apparatus for the optical disc recording apparatus and the optical disc recording method.

The second object of the present invention is to provide an optical disc recording apparatus and an optical disc recording method which each record video objects so that it can be judged whether the seamless reproduction of these video objects is possible before the reproduction of the video objects, and an optical disc reproduction apparatus for the optical disc recording apparatus and the optical disc recording method.

The stated objects are achieved by an optical disc recording apparatus including: a receiving unit operable to receive designations from a user, the designations including a recording start designation, a recording end designation, a pause designation, and a pause release designation; an encoding unit operable to generate one video object by compressing audio and video data for a period starting when the receiving unit receives the recording start designation or the pause release designation and ending when the receiving unit receives the pause designation or the recording end designation, where if the receiving unit receives the pause release designation, a video object is generated so that the video object is capable of being seamlessly reproduced with an immediately preceding video object in a reproduction apparatus; a generation unit operable to generate a seamless flag each time a video object is generated, the seamless flag showing whether the video object corresponding to the seamless flag is capable of being seamlessly reproduced with an immediately preceding video object in the reproduction apparatus; and a recording unit operable to record, onto an optical disc, each video object generated by the encoding unit and each seamless flag generated by the generation unit.

Here, if the receiving unit receives the pause designation, the encoding unit completes a generation of a current video object and preserves an internal state of the encoding unit at a point when the generation of the current video object is completed, and if the receiving unit receives the pause release designation, the encoding unit starts a generation of a new video object using the preserved internal state as an initial state.

With this construction, when the user inputs the pause designation and then the pause release designation during recording, a video object generated until the pause designation and a video object generated after the pause release designation are recorded in real time so that the seamless reproduction of these video objects is possible. Also, this construction allows a reproduction apparatus to judge whether the seamless reproduction of video objects is possible by referring to the seamless flag before the reproduction of the video objects.

Here, the generation unit obtains, from the encoding unit, a last system clock reference value of the current video object and a first system clock reference value of the new video object, and the recording unit records the seamless flag, the last system clock reference value, and the first system clock reference value onto the optical disc as video object information.

This construction allows the reproduction apparatus to smoothly perform special reproduction, such as reverse quick reproduction, by referring to the system clock reference values in the video object information before the reproduction of video objects.

Here, the encoding unit replaces one of a last section of audio data immediately before the pause designation and a start section of audio data immediately after the pause release designation with silent data, each of the last section and the start section being shorter than one audio frame.

With this construction, the encoding unit replaces the last section or the first section with silent data and then generate compressed audio data. This avoids a situation where data having no correlation successively exists in an audio frame divided by a pause operation. As a result, it is ensured that no noise will occur during reproduction.

The stated objects are also achieved by a reproduction apparatus for an optical disc that records a plurality of video objects and a plurality of pieces of video object information, each video object including compressed video data and compressed audio data, and each piece of video object information corresponding to one video object and including a seamless flag that shows whether the corresponding video object is capable of being seamlessly reproduced with an immediately preceding video object, the reproduction apparatus including: a reading unit operable to read, from the optical disc, a piece of video object information and a video object corresponding to the piece of video object information; a decoding unit operable to generate audio and video data by decoding the video object read by the reading unit; and a control unit operable to control seamless reproduction by the decoding unit according to a seamless flag included in the piece of video object information read by the reading unit.

With this construction, the reproduction apparatus can judge whether the seamless reproduction of a video object is possible by referring to the seamless flag before the reproduction of the video object.

Here, the decoding unit includes: a separating unit operable to separate the video object read by the reading unit into compressed video data and compressed audio data; a video buffer operable to temporarily hold the compressed video data; an audio buffer operable to temporarily hold the compressed audio data; a first decoder operable to decode the compressed video data in the video buffer; and a second decoder operable to decode the compressed audio data in the audio buffer, where if a seamless flag corresponding to a next video object, which should be reproduced next to a current video object, shows that seamless reproduction of the next video object is possible, the control unit controls the decoding unit so that the next video object read by the reading unit is supplied to the first and second decoding units without initializing the video buffer and the audio buffer at a point when the current video object is switched to the next video object.

With this construction, if judging that seamless reproduction is possible, the reproduction apparatus reproduces a video object without initialing video and audio buffers at a point when an immediately preceding video object is switched to the video object. As a result, the reproduction apparatus can seamlessly reproduce video objects without difficulty.

Here, each piece of video object information includes, in addition to a seamless flag, a first system clock reference value of a video object corresponding to the seamless flag and a last system clock reference value of a video object immediately preceding the corresponding video object, and if the seamless flag corresponding to the next video object shows that seamless reproduction of the next video object is possible, the control unit controls the first decoding unit and the second decoding unit to change an internal system time clock according to a first system clock reference value and a last system clock reference value included in a piece of video object information corresponding to the next video object.

With this construction, the reproduction apparatus can smoothly perform special reproduction, such as reverse quick reproduction, of video objects by referring to the system clock reference values in the video object information before the reproduction of the video objects.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

1. Outline of Optical Disc Recording and Reproduction Apparatus

Figure 1:
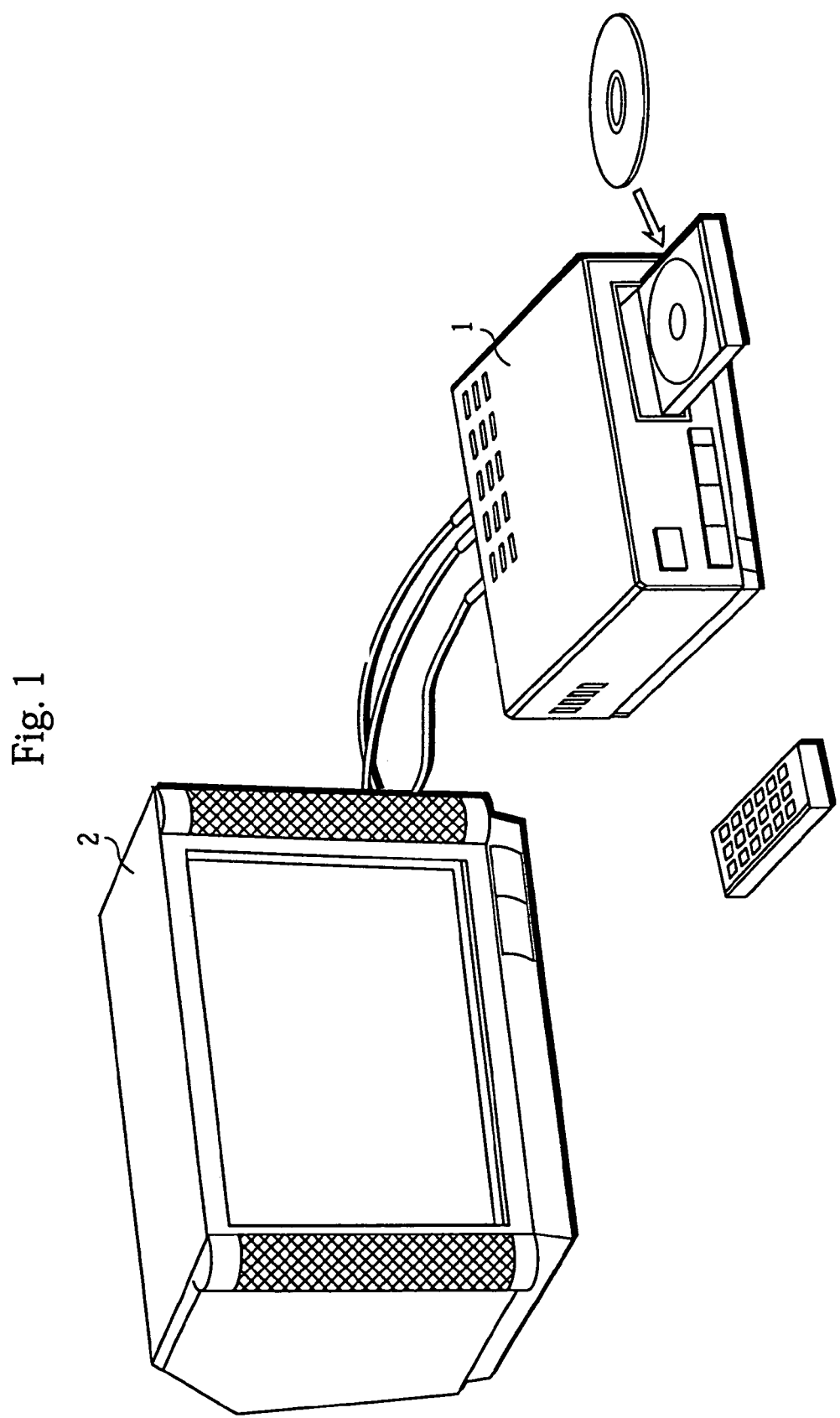
FIG. 1 shows the appearance of an optical disc recording and reproduction apparatus of an embodiment of the present invention.

The following description concerns the case where an optical disc recording and reproduction apparatus 1 (hereinafter abbreviated to the "optical disc apparatus 1") is used instead of a stationary VCR. As shown in FIG. 1, the optical disc apparatus 1 is connected to an antenna (not shown) and a television set 2. Under these conditions, the optical disc apparatus 1 generates compressed video and audio data in real time by digitizing and encoding video and audio signals included in the television signals received by the antenna or included in the video signals inputted via an input terminal. The compressed video and audio data is hereinafter referred to as the "video object" or simply the "VOB". The optical disc apparatus then records the VOB onto an optical disc. The optical disc apparatus 1 also reproduces a VOB recorded on an optical disc.

The optical disc apparatus 1 generates one video object in real time during the period between the time when a user designates a recording start or a pause release and the time when the user designates a pause operation or a recording end. In particular, if a pause operation is designated during recording, the optical disc apparatus 1 generates a video object before a pause designation and another video object after a pause release designation so that the seamless reproduction of these video objects is guaranteed. Then the optical disc apparatus 1 records the video objects onto an optical disc. The optical disc apparatus 1 also generates a seamless flag and seamless information each time a video object is generated and records the seamless flag and seamless information onto an optical disc as management information.

The seamless flag is a flag showing whether seamless reproduction is possible. The seamless information includes the last SCR (System Clock Reference) of the immediately preceding VOB and the first SCR of the current VOB. The seamless flag and seamless information are referred to prior to reproduction.

2. Structure of Optical Disc

<2.1 Physical Structure of Optical Disc>

An optical disc of the present embodiment is described below by taking a DVD-RAM as an example. The physical structure of a DVD-RAM is described in detail in various documents, such as Japanese Laid-Open Patent Application No. 8-7282 disclosing a method for recording data onto both of lands and grooves and Japanese Laid-Open Patent Application No. 7-93873 disclosing a zone CLV (Constant Linear Velocity) method. Therefore, the detailed description of the physical structure of a DVD-RAM is omitted here.

<2.2 Logical Structure of Optical Disc (DVD-RAM)>

Figure 2:
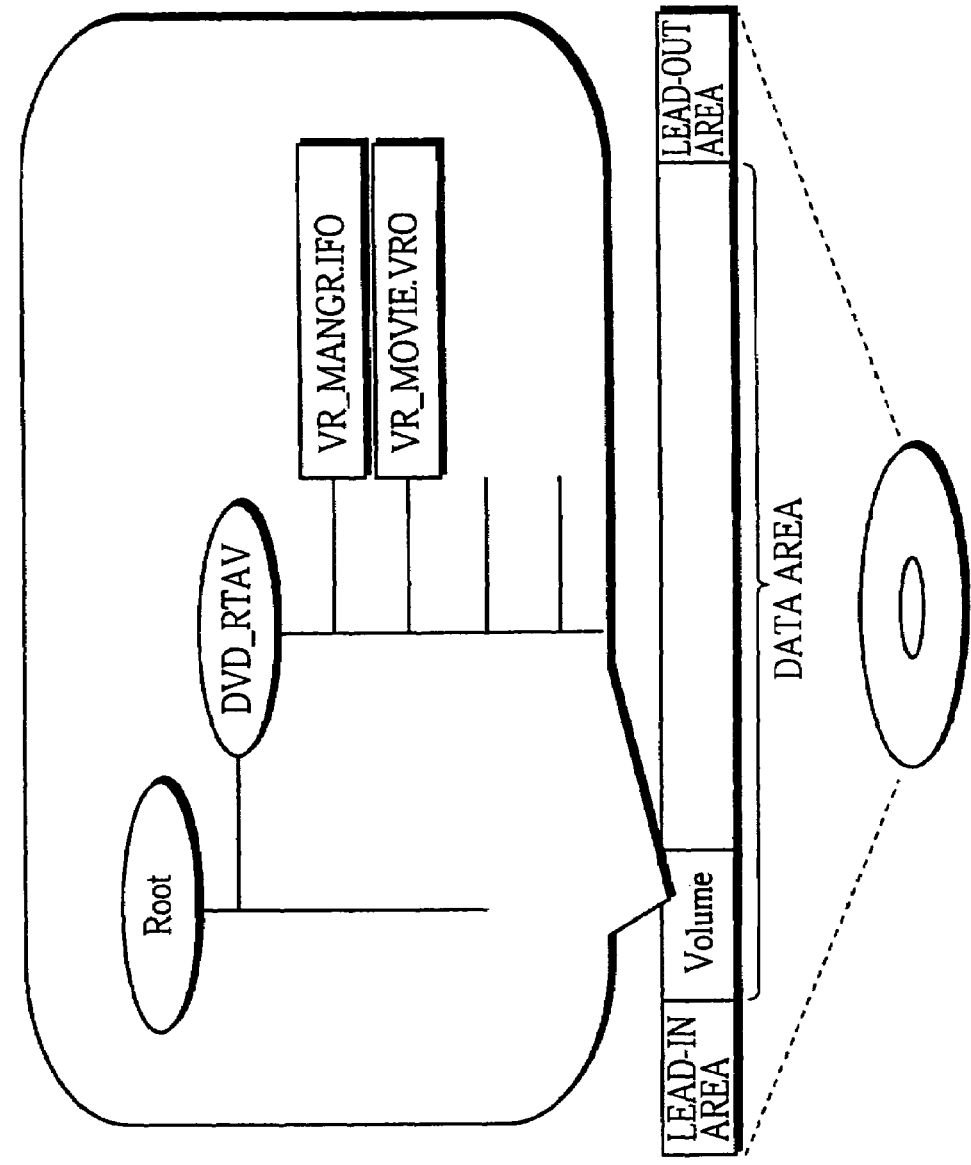
FIG. 2 shows a lead-in area, a data area, and a lead-out area, which are provided within the area of an optical disc, and the file structure of data recorded in the data area.

FIG. 2 shows a lead-in area, a data area, and a lead-out area, which are provided within the area of the optical disc, and the file structure of data recorded in the data area.

The lead-in area provided at the start of the disc area (the innermost periphery of the disc) stores a reference signal necessary to stabilize the servo control in the optical disc apparatus 1 and an identification signal used to distinguish the present optical disc from other media. The data area is provided to follow the lead-in area and stores files holding VOBs and management information. The lead-out area is provided at the end of the disc area (the outermost periphery of the disc) and, like the lead-in area, stores data, such as a reference signal.

Volume information, which is to say information for a file system, is stored at the start of the data area. The file system is well known and so is not described here. FIG. 2 shows an example structure of directories and files that are read and written through the file system.

In the file structure shown in FIG. 2, a DVD_RTAV (DVD-_Real Time Audio Visual) directory that includes all files dealt with by the optical disc apparatus 1 is provided beneath a ROOT directory. The files in the DVD_RTAV directory are broadly categorized into one management information file and one or more AV files in which VOBs are held.

In FIG. 2, the management information file is referred to as VR_MANGR.IFO and an AV file is referred to as VR_MOVIE.VRO. The VR_MOVIE.VRO holds video (and audio) data, that is, contains one or more VOBs.

<2.2.1 AV File>

Figure 3:
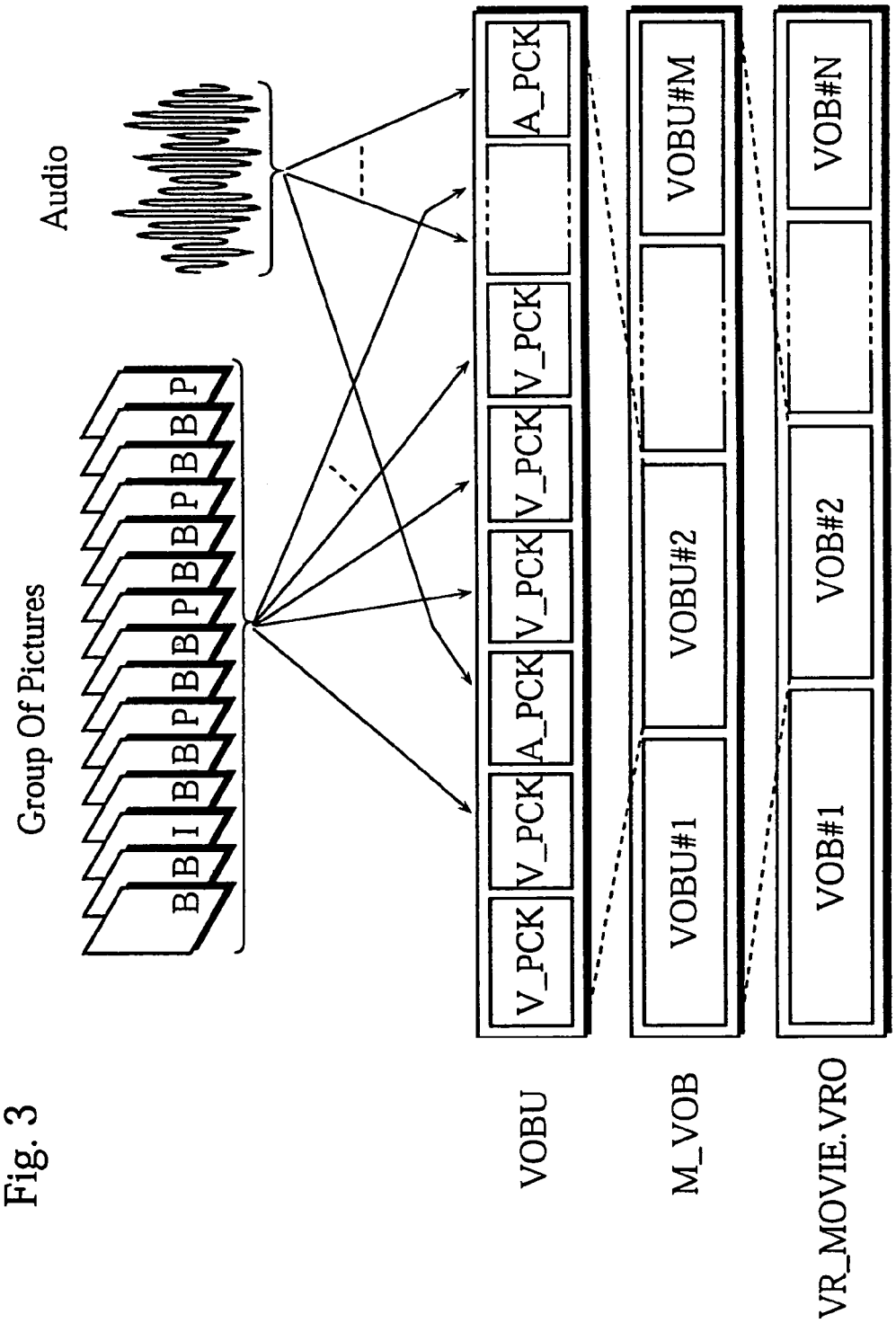
FIG. 3 shows the data structure of a VR_MOVIE.VRO file shown in FIG. 2.

FIG. 3 shows the data structure of the VR_MOVIE.VRO shown in FIG. 2.

As shown in FIG. 3, VOB#1-VOB#N are arranged in the VR_MOVIE.VRO (here N is a number not less than one). Each VOB includes a plurality of VOBUs and each VOBU includes a plurality of packs of a fixed size (2 kilobytes). The packs are broadly categorized into video packs (V_PCK) and audio packs (A_PCK).

Each video pack (V_PCK) contains video data.

Each audio pack (A_PCK) contains audio data that has been encoded with a method, such as MPEG audio, Dolby AC3, and linear PCM. Video packs and audio packs are interleaved within VOBUs.

Each pack contains various time stamps, such as a SCR, a DTS (Decode Time Stamp), and a PTS (Presentation Time Stamp). The SCR shows the time at which the corresponding pack should be fetched from a track buffer and inputted into a video buffer during reproduction. The DTS shows the time at which the corresponding pack should be fetched from the video buffer and inputted into a video decoder. The PTS shows the time at which the decoded data of the corresponding pack should be presented (a picture is displayed or audio is outputted). Note that because the time taken to decode audio data is considerably shorter than that taken to decode video data, the decoding time for audio data is not regarded and DTSs are not given to audio packs. As a result, PTSs doubles as DTSs in the case of audio packs.

<2.2.2 Management File>

Figure 4:
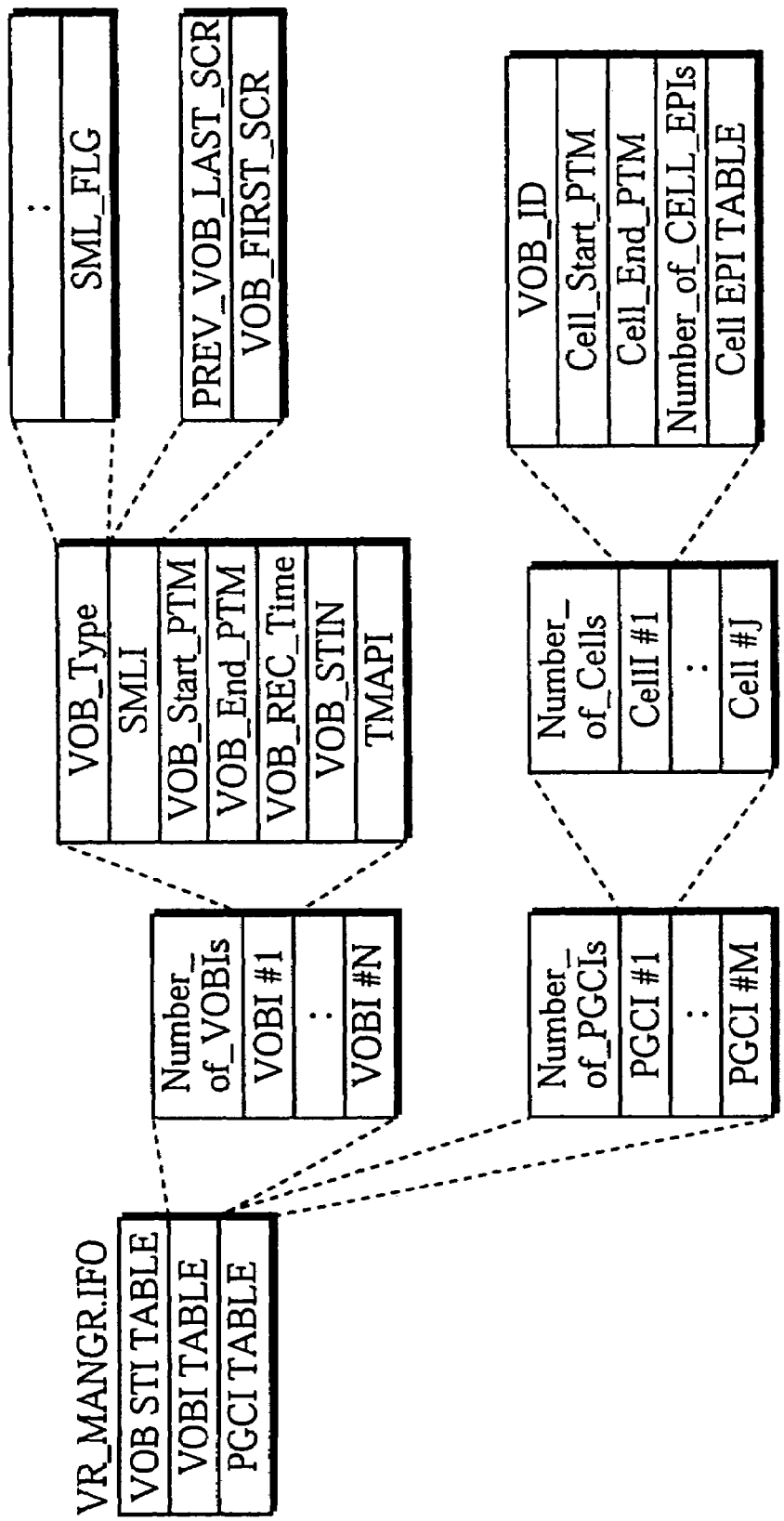
FIG. 4 shows the hierarchical data structure of a management information file VR_MANGR.IFO shown in FIG. 2.

FIG. 4 shows the hierarchical data structure of the management information file VR_MANGR.IFO shown in FIG. 2.

The VR_MANGR.IFO is information also called RT_VMG (Real Time Recording_Video Manager) and includes a VOB STI (stream information) table, a VOBI (VOB Information) table, and a PGCI (program chain information) table.

The VOB_STI table gives VOB stream information (referred to as "VOB_STI" in FIG. 4) related to one or more VOBs and shows the video attribute and audio attribute of the VOBs.

The VOBI table gives "Number_of_VOBIs" showing the total number of pieces of VOB information (VOBI) related to this table and "VOBI#1-VOBI#N". Here, N corresponds to the total number of VOBI.

Each VOBI corresponds to one VOB and is information concerning the VOB. Each VOBI includes a VOB type (VOB_Type), seamless information (SMLI), a VOB presentation start time (VOB_START_PTM), a VOB presentation end time (VOB_End_PTM), a VOB recording time (VOB_REC_Time), a VOB stream information number (VOB_STIN), and time map information (TMAPI).

The VOB type (VOB_Type) includes a seamless flag (SML_FLG) that shows, if the corresponding VOB and a VOB recorded immediately before the corresponding VOB are sequentially reproduced, whether seamless reproduction is possible. The seamless flag is set as "1" if the corresponding VOB has been generated by a pause release designation from a user, and is set as "0" if the corresponding VOB has been generated by a recording start designation from a user. Here, the seamless flag set as "1" shows that seamless reproduction is possible and the seamless flag set as "0" shows that seamless reproduction is not always possible.

The seamless information (SMLI) includes the last SCR of the VOB recorded immediately before the corresponding VOB (PREV_VOB_LAST_SCR) and the first SCR of the corresponding VOB (VOB_FIRST_SCR). These SCRs can be used when video objects are switched during forward quick reproduction and reverse quick reproduction.

The VOB presentation start time (VOB_START_PTM) and the VOB presentation end time (VOB_End_PTM) respectively show the start time and end time of the presentation (image display and audio output) of the corresponding VOB. The VOB recording time (VOB_REC_Time) shows the recording time of the corresponding VOB.

The VOB stream information number (VOB_STIN) is the number assigned to the VOB stream information related to the corresponding VOB.

The time map information (TMAPI) includes a time map that associates the reproduction time of each VOBU of the corresponding VOB with a recording position on the optical disc.

The PGCI table gives program chain information (PGCI) that shows the reproduction order of VOBs or the reproduction order of given reproduction sections of VOBs. In FIG. 4, PGCI#1 includes a plurality of pieces of cell information (CellI#1-CellI#J). Each cell shows a reproduction section, which is specified by a start time (Cell_Start_PTM) and an end time (Cell_End_PTM), of the VOB specified by a VOB ID. The VOB reproduction sections specified by CellI#1-CellI#J are reproduced in the arrangement order of these cell information.

The following description is based on the assumption that the optical disc apparatus 1 generates two video objects (VOB#1 and VOB#2), and PGCI#1 by receiving a recording start designation, a pause designation, a pause release designation, and then a recording end designation from a user. The PGCI#L includes two pieces of cell information, which is to say CellI#1 whose Cell_Start_PTM and Cell_End_PTM are respectively set as the VOB_Start_PTM and VOB_END PTM of VOB#L, and CellI#2 whose Cell_Start_PTM and Cell_End_PTM are respectively set as the VOB_Start_PTM and VOB_END_PTM of VOB#2. That is, the PGCI#L shows that the entire section of the VOB#L and the entire section of the VOB#2 should be reproduced in this order.

In this case, because the VOB#L is a video object recorded before a pause designation and the VOB#2 is a video object recorded after a pause release designation, the VOB information (VOBI#2) of the VOB#2 includes a seamless flag set as "1" and valid seamless information.

3. Optical Disc Recording and Reproduction Apparatus

Figure 5:
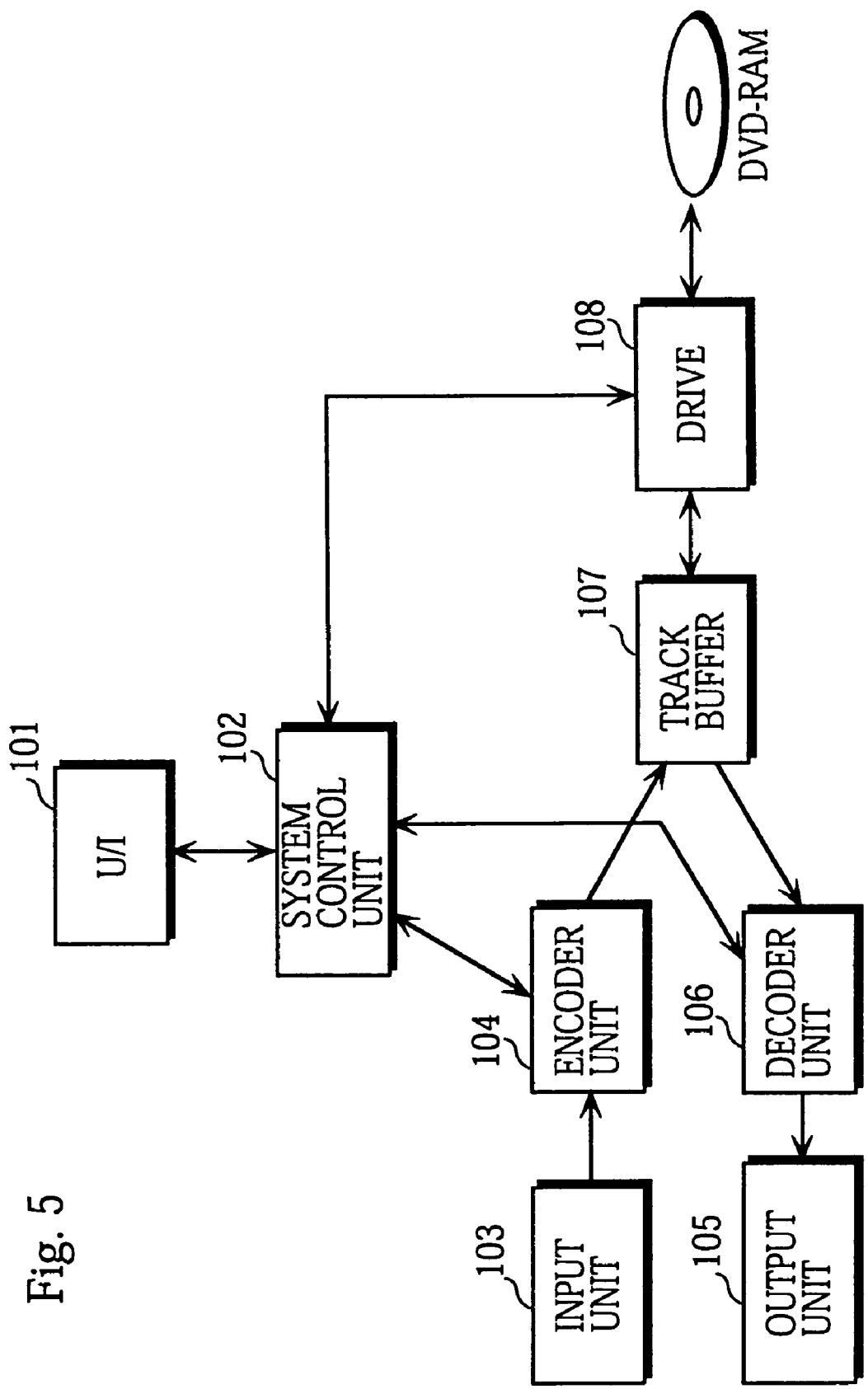
FIG. 5 is a block diagram showing the construction of the main part of the optical disc recording and reproduction apparatus shown in FIG. 1.

FIG. 5 is a block diagram showing the construction of the main part of the optical disc apparatus 1 shown in FIG. 1.

As shown in FIG. 5, the optical disc apparatus 1 includes a user interface unit 101, a system control unit 102, an input unit 103, an encoder unit 104, an output unit 105, a decoder unit 106, a track buffer 107, and a drive 108.

The user interface unit 101 (referred to as "U/I" in FIG. 5) includes an operation panel and a photoreceiving unit for a remote controller shown in FIG. 1. With this construction, the user interface unit 101 receives user's instructions inputted using the operation panel and the remote controller. The user's instructions are, for instance, a recording start designation, a recording end designation, a pause designation, a pause release designation, and a reproduction designation.

The system control unit 102 sends, if receiving a recording start designation, a recording end designation, a pause designation, or a pause release designation from the user interface unit 101, a notification that the designation is received to the encoder unit 104. Also, if receiving a reproduction start designation or a reproduction end designation from the user interface unit 101, the system control unit 102 sends a notification that the designation is received to the decoder unit 106.

More specifically, if receiving a recording start designation, the system control unit 102 sends a notification that the recording start designation is received to the encoder unit 104 to have the encoder unit 104 start the generation of a new video object. Note that such a notification is hereinafter referred to as the "recording start notification".

If receiving a recording end designation, the system control unit 102 sends a notification that the recording end designation is received to the encoder unit 104 to have the encoder unit 104 complete the generation of the current video object. Note that such a notification is hereinafter referred to as the "recording end notification". In this case, the system control unit 102 also generates VOBI and VOB_STI of the video object according to the encoding information sent from the encoder unit 104 and records the VOBI and VOB_STI onto the optical disc via the drive 108. The encoding information shows whether seamless reproduction is possible. If the seamless reproduction is possible, the encoding information also shows the last SCR of the immediately preceding VOB (PREV_VOB_LAST_SCR) and the first SCR of the current VOB (VOB_FIRST_SCR).

If receiving a pause designation, the system control unit 102 sends a notification that the pause designation is received to the encoder unit 104 to have the encoder unit 104 complete the generation of the current video object and preserve the internal state (not to reset the internal state). Note that such a notification is hereinafter referred to as the "pause notification". Also, the system control unit 102 generates VOBI and VOB_STI according to the encoding information sent from the encoder unit 104 and records the VOBI and VOB_STI onto the optical disc via the drive 108.

If receiving a pause release designation, the system control unit 102 sends a notification that the pause release designation is received to the encoder unit 104 to have the encoder unit 104 start the generation of a new video object using the internal state preserved in the encoder unit 104 as an initial state. In this case, the new video object generated after the pause release designation can be seamlessly reproduced because the encoder unit 104 takes over the last internal state, which is to say the internal state of the point when the generation of the immediately preceding video object is completed.

The input unit 103 inputs video and audio data obtained by demodulating broadcast signals into the encoder unit 104.

The encoder unit 104 generates, under the control of the system control unit 102, a VOB including video and audio packs by compressing video and audio signals inputted from the input unit 103. On receiving a pause notification, the encoder unit 104 completes the generation of the current video object and preserves the internal state (does not reset the internal state). On receiving a pause release notification, the encoder unit 104 starts the generation of a new video object using the preserved internal state as the initial state (that is, by taking over the preserved internal state).

The track buffer 107 temporarily holds a part of a VOB generated by the encoder unit 104 during recording and a part of a VOB read from a DVD-RAM during reproduction.

The drive 108 operates as follows during recording and reproduction. After a DVD-RAM is placed on the drive 108, the drive 108 performs servo control and rotation control, writes a VOB part held in the track buffer 107 onto the DVD-RAM using an optical pickup, reads a VOB part recorded on the DVD-RAM using the optical pickup, and stores the read VOB part in the track buffer 107. The actual reading/writing of a VOB part from/onto a DVD-RAM is performed in ECC (Error Correcting Code) block units. However, this is not related to the present invention and so is not described here.

The decoder unit 106 decompresses, under the control of the system control unit 102, a VOB part that is read from the DVD-RAM and is inputted via the track buffer 107, and generates video and audio signals from the decompressed VOB part.

The output unit 105 converts digital video and audio signals sent from the decoder unit 106 into analog signals and outputs the analog signals to a device, such as the television set 2 shown in FIG. 1, connected to the optical disc apparatus 1.

<3.1 Encoder Unit>

Figure 6:
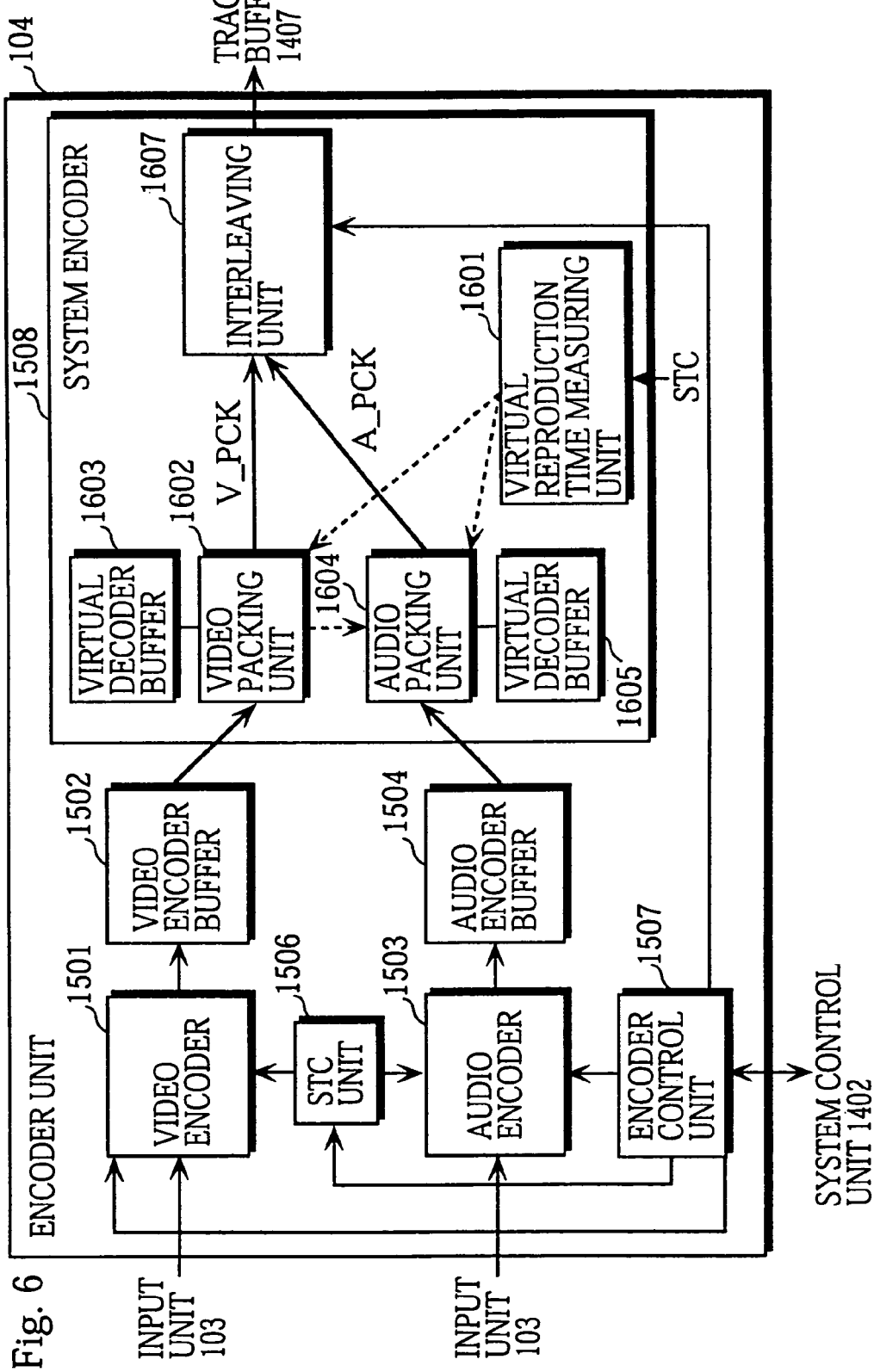
FIG. 6 is a block diagram showing the detailed construction of an encoder unit shown in FIG. 5.

FIG. 6 is a block diagram showing the detailed construction of the encoder unit 104 shown in FIG. 5.

As shown in FIG. 6, the encoder unit 104 includes a video encoder 1501, a video encoder buffer 1502, an audio encoder 1503, an audio encoder buffer 1504, a control information buffer 1505, a system time clock unit 1506 (hereinafter abbreviated to the "STC unit 1506"), an encoder control unit 1507, and a system encoder 1508. Also, the system encoder 1508 includes a virtual reproduction time measuring unit 1601, a video packing unit 1602', a virtual decoder buffer 1603, an audio packing unit 1604, and a virtual decoder buffer 1605.

The video encoder 1501 includes a video input buffer (not shown), and holds video data inputted from the input unit 103 using the video input buffer, encodes (compresses) the video data in accordance with an MPEG2 standard, and sends the compressed video data to the video encoder buffer 1502.

The audio encoder 1503 includes an audio input buffer (not shown), holds audio data inputted from the input unit 103 using the audio input buffer, encodes (compresses) the audio data, and sends the compressed audio data to the audio encoder buffer 1504.

The STC unit 1506 generates a clock signal (system time clock) based on which encoding is performed.

The encoder control unit 1507 takes overall control of the encoder unit 104 during encoding. That is, under the control of the encoder control unit 1507, the encoder unit 104 starts the encoding operation on receiving a recording start notification or a pause release notification and ends the encoding operation on receiving a recording end notification or a pause notification. It should be noted here that if receiving first a pause notification during recording and then a pause release notification, the encoder unit 104 performs the encoding operation after the pause release notification using the last internal state before the pause operation.

More specifically, if receiving a recording start notification, the encoder control unit 1507 controls the video encoder 1501, audio encoder 1503, and system encoder 1508 to start the generation of a video object. In this case, the internal state of each buffer in the encoder unit 104 may be reset, and the reset internal state may be used as the initial state.

If receiving a recording end notification, the encoder control unit 1507 controls the video encoder 1501, audio encoder 1503, and system encoder 1508 to end the generation of a video object. In this case, the internal state of each buffer in the encoder unit 104 may be reset after the generation of the video object is completed.

If receiving a pause notification, the encoder control unit 1507 controls the video encoder 1501, audio encoder 1503, and system encoder 1508 to end the generation of a video object and to preserve (not to reset) the internal states of the video encoder buffer 1502, audio encoder buffer 1504, and virtual decode buffers 1603 and 1605 even after the generation of the video object is completed. In this manner, the internal state of the encoder unit 104 is preserved.

If receiving a pause release notification, the encoder control unit 1507 controls the video encoder 1501, audio encoder 1503, and system encoder 1508 to start the generation of a new video object using the initial state preserved in the encoder unit 104 as the initial state. This makes it possible to seamlessly reproduce the new video object.

The encoder control unit 1507 also adjusts the compression rate by the video encoder buffer 1502 according to data occupancies of the virtual decoder buffers 1603 and 1605. Note that in this specification, the term "data occupancy" refers to the extent to which the capacity of a buffer is being used to store data. This adjustment is performed to ensure that no overflows and underflows will occur in the video and audio buffers of a decoder during reproduction.

The system encoder 1508 fetches compressed video and audio data from the video encoder buffer 1502 and the audio encoder buffer 1504 in units of the size of the payload in each pack (or packet). Then the system encoder 1508 generates video packs and audio packs, interleaves these packs to generate VOBUs one at a time, and sequentially outputs the VOBUs to the track buffer 1407.

<3.1.1 System Encoder>

In the system encoder 1508 shown in FIG. 6, the virtual reproduction time measuring unit 1601 generates a virtual reproduction time from the STC generated by the STC unit 1506. The virtual reproduction time is referred to when time stamps, such as SCR, DTS (Decode Time Stamp), and PTS (Presentation Time Stamp), are given to each pack. Here, the DTS is a time stamp showing the time at which the decoder unit 1406 should start decoding during reproduction, and the PTS is a time stamp showing the time at which decoded video data should be displayed or decoded audio data should be outputted during reproduction.

The video packing unit 1602 fetches compressed video data from the video encoder buffer 1502 and sequentially generates video packs in which the compressed video data is packed. When doing so, time stamps are determined so that no overflows and underflows will occur in the virtual decoder buffer 1603.

The virtual decoder buffer 1603 is a virtual buffer used to simulate the data occupancy of the buffer (the video buffer of the decoder) that temporarily holds compressed video data during reproduction.

The audio packing unit 1604 fetches compressed audio data from the audio encoder buffer 1504 and sequentially generates audio packs in which the compressed audio data is packed. When doing so, time stamps are determined so that no overflows and underflows will occur in the virtual decoder buffer 1605.

The virtual decoder buffer 1605 is a virtual buffer used to simulate the data occupancy of the buffer (the audio buffer of the decoder) that temporarily holds compressed audio data during reproduction.

The interleaving unit 1607 fetches packs generated by the video packing unit 1602 and the audio packing unit 1604 in increasing order of SCR and sequentially outputs the fetched packs to the track buffer 1407.

4. Recording Operation Before and after Pause Operation

Figure 7:
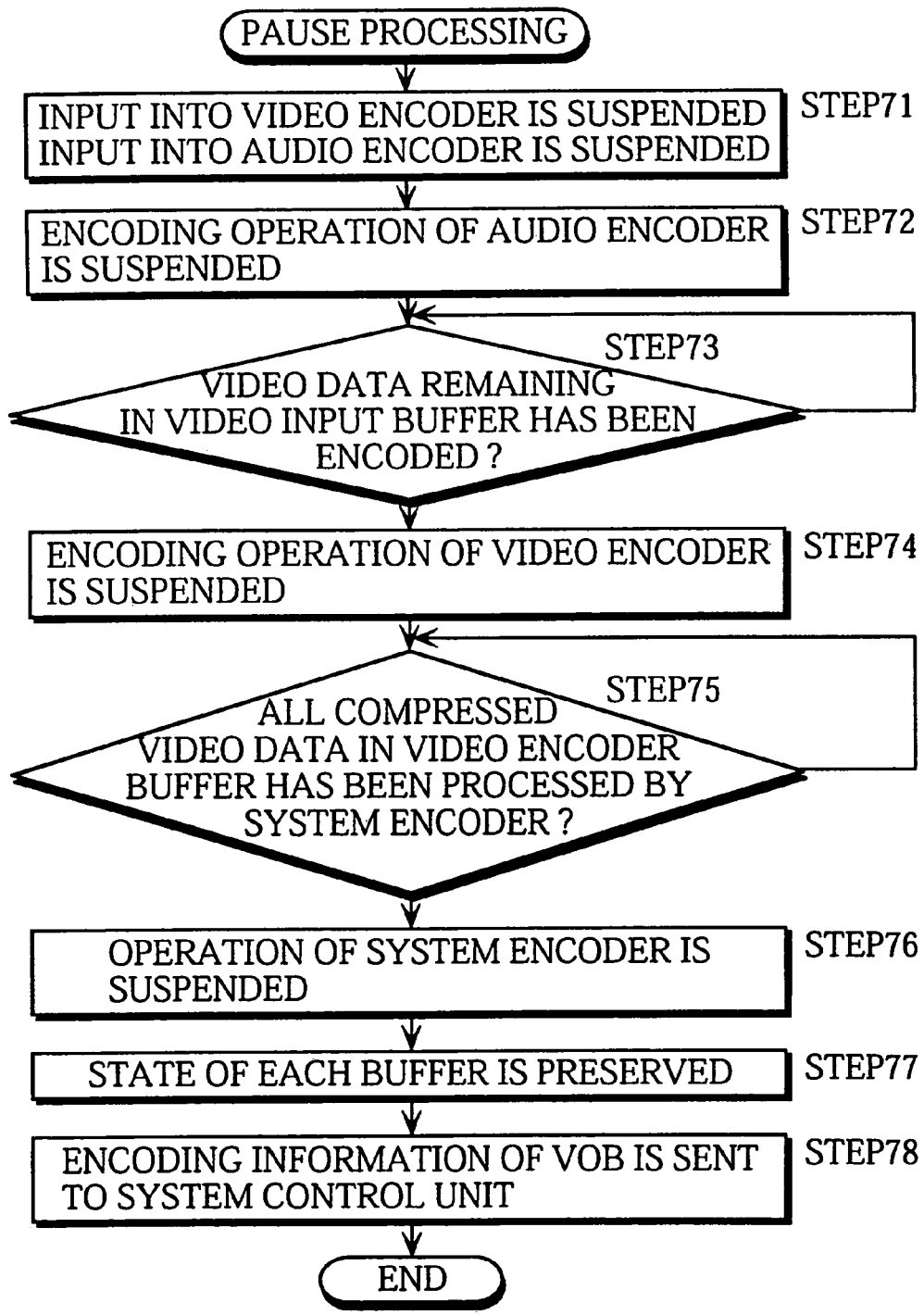
FIG. 7 is a flowchart showing the details of pause processing under the control of an encoder control unit shown in FIG. 6.

The recording operation before and after a pause operation is described below with reference to FIGS. 7 and 9. FIG. 7 is a flowchart showing the details of pause processing under the control of the encoder control unit 1507, and FIG. 9 shows the internal operation of the encoder unit 104 before and after a pause operation.

As shown in FIG. 7, on receiving a pause notification from the system control unit 102 during recording, the encoder control unit 1507 suspends the input of video data from the input unit 103 to the video input buffer in the video encoder 1501 at a boundary between pictures, and suspends the input of audio data from the input unit 103 to the audio input buffer in the audio encoder 1503 (step 71). Then the encoder control unit 1507 controls the audio encoder 1503 to suspend the encoding operation at a boundary between audio frames (step 72).

Figure 9:
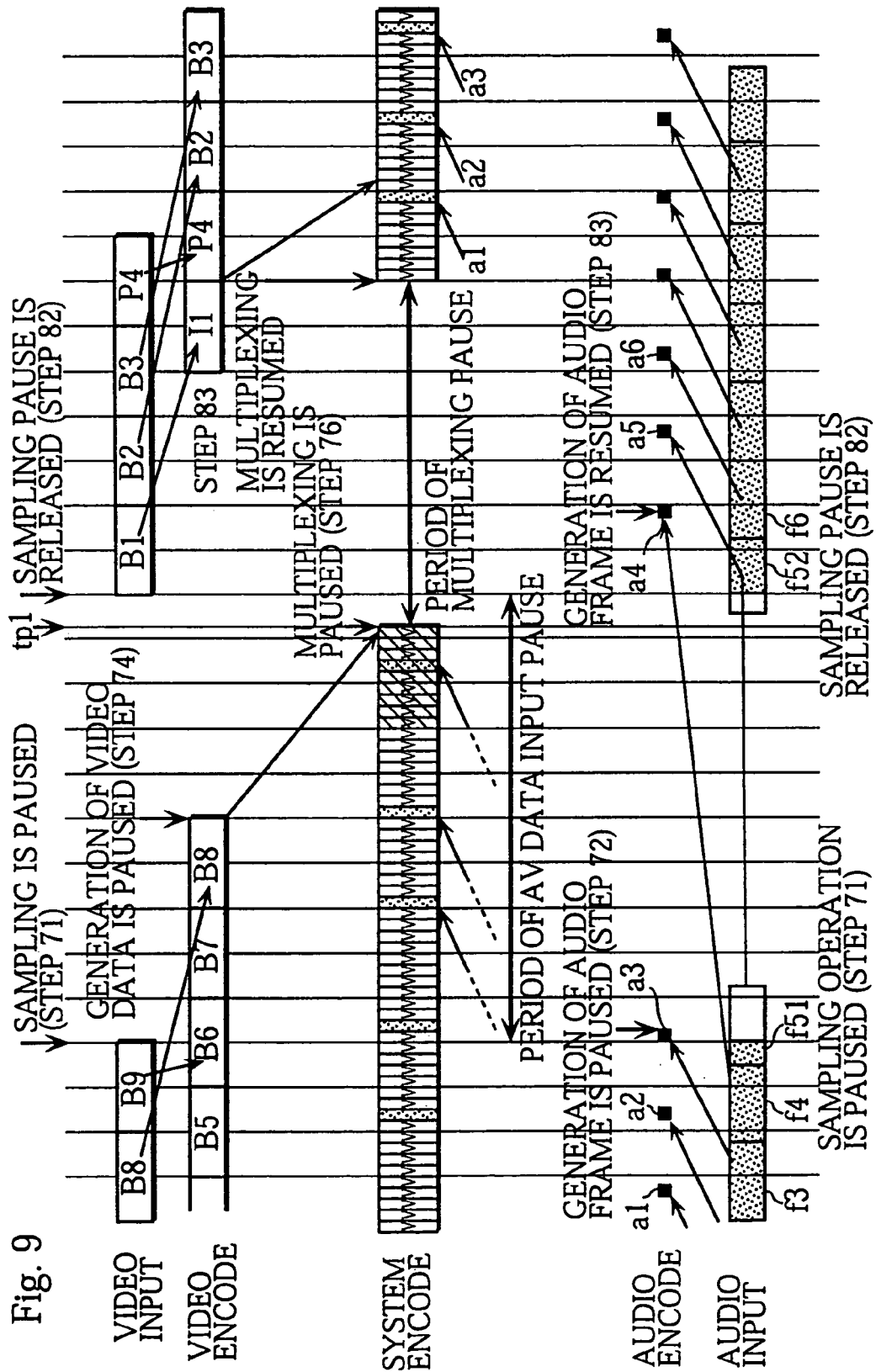
FIG. 9 shows the internal operation of the encoder unit before and after a pause operation.

In FIG. 9, at this point in time, the audio encoder 1503 has encoded an audio frame f3 in the audio input buffer, that is, converted the audio frame f3 into a compressed audio data a3.

Consequently, the audio input buffer in the audio encoder 1503 holds an audio frame f4 and an audio frame piece f51 and the audio encoder buffer 1504 holds compressed audio data a1, a2, and a3.

Meanwhile, at this point in time, the video input buffer of the video encoder 1501 holds picture data B8 and P9.

Under this condition, the video encoder 1501 encodes video data remaining in the video input buffer. As a result, as shown in FIG. 9, the video encoder 1501 has completed the encoding of pictures B5, P9, B7, and B8.

After the video encoder 1501 has completed the encoding of picture data remaining in the video input buffer (step 73), the encoder control unit 1507 controls the video encoder 1501 to suspend the encoding operation (step 74).

The compressed video data generated until the operation of the video encoder 1501 was suspended is temporarily held in the video encoder buffer 1502. The system encoder 1508 fetches compressed video data remaining in the video encoder buffer 1502 and multiplexes the fetched data with compressed audio data to generate video objects.

When the video encoder buffer 1502 becomes empty (step 75), the encoder control unit 1507 has the system encoder 1508 suspend the operation (step 76). In this manner, the generation of the current VOB is completed.

Even after the operations described above, the encoder control unit 1507 does not reset various buffers, that is, preserves the internal states of the buffers (step 77) and sends encoding information concerning the newly generated video object to the system control unit 102 (step 78). Here, the various buffers are (a) the video input buffer in the video encoder 1501, (b) the video encoder buffer 1502, (c) the virtual decoder buffer 1603, (d) the audio input buffer in the audio encoder 1503, (e) the audio encoder buffer 1504, and (f) the virtual decoder buffer 1605.

In FIG. 9, at the point when the operation of the system encoder 1508 is suspended, the buffers (a) and (b) are empty, the buffers (c) and (f) preserve the last data occupancies before the pause operation, the buffer (d) holds the audio frame data f4 and the audio frame piece f51, and the buffer (e) holds the audio frame data a1, a2, and a3. These buffer states are preserved until a pause release notification is sent from the system control unit 102.

Figure 8:
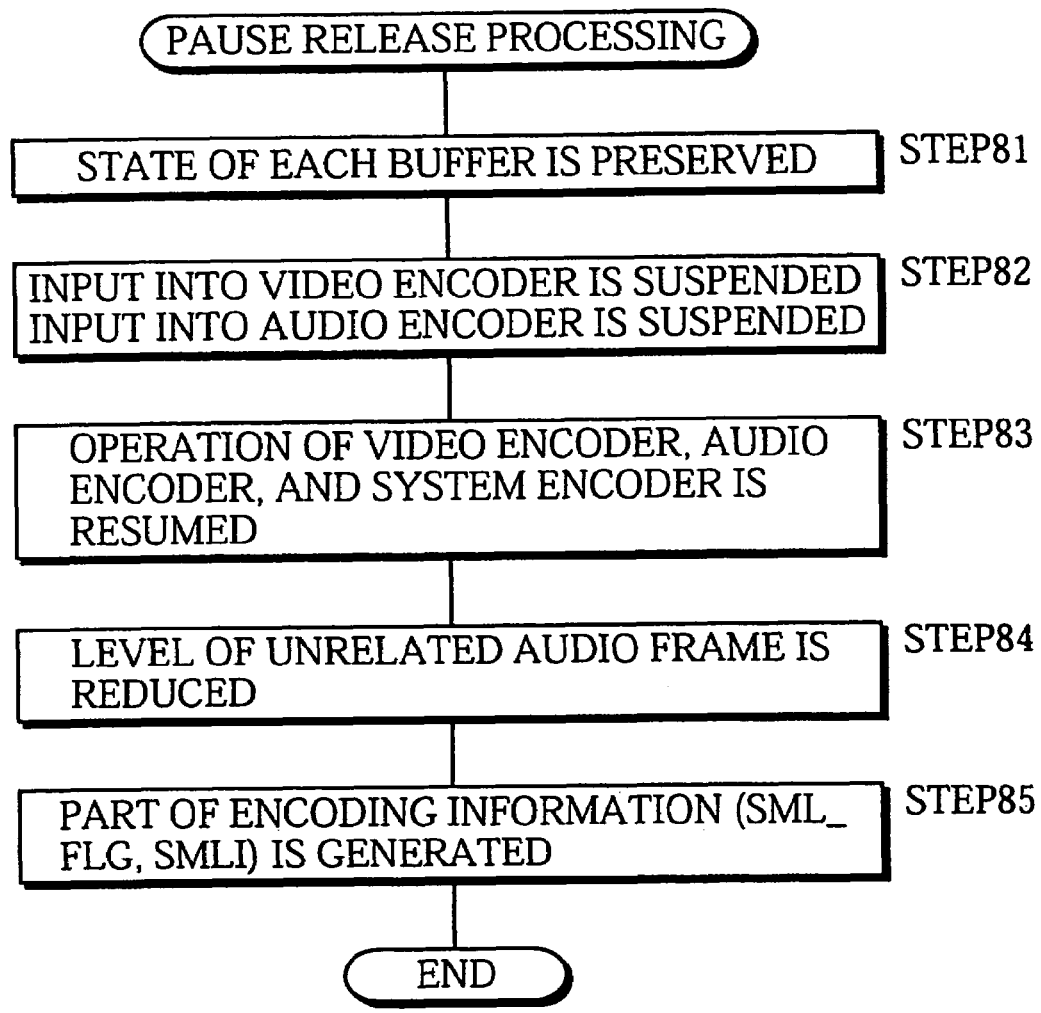
FIG. 8 is a flowchart showing the details of pause release processing under the control of the encoder control unit.

FIG. 8 is a flowchart showing the details of pause release processing under the control of the encoder control unit 1507.

As shown in this drawing, if receiving a pause release notification from the system control unit 102 during a pause operation, the encoder control unit 1507 does not reset the buffers (a)-(f) and preserves the internal states of the buffers by disabling reset signals to be inputted into the buffers (step 81). Then the encoder control unit 1507 resumes the input of video data from the input unit 103 to the video input buffer of the video encoder 1501 and the input of audio data from the input unit 103 to the audio input buffer of the audio encoder 1503 (step 82). The encoder control unit 1507 also controls the video encoder 1501, audio encoder 1503, and system encoder 1508 to resume the encoding operations (step 83).

After resuming the encoding operation, the audio encoder 1503 reduces the audio level of audio data having no correlation in an audio frame and performs encoding (step 84). In FIG. 9, the audio data having no correlation is audio frame pieces f51 and f52 whose continuity is broken by the pause operation. For instance, the audio encoder 1503 replaces at least one of the audio frame pieces f51 and f52 with silent data. As a result, the audio level of the audio data having no correlation in an audio frame divided by a pause operation is reduced. This guarantees that no noise (electric noise) will occur during reproduction.

In this manner, the generation of a new video object is started by taking over the states of the point when a pause operation is designated.

The encoder control unit 1507 generates and holds a seamless flag and seamless information as part of encoding information that should be sent to the system control unit 102 when the generation of a video object is completed (step 85).

In FIG. 9, after a pause release notification is received, the audio encoder 1503 encodes the audio frame data f4 and the audio frame piece f51 preserved in the buffer (d) and the system encoder 1508 interleaves the compressed audio frame data a1, a2, and a3 preserved in the buffer (e) within video objects. Also, the encoder control unit 1507 controls the compression ratios of the encoding operations of the video encoder 1501 and audio encoder 1503 using the data occupancies preserved in the buffers (c) and (d). This makes it possible to seamlessly reproduce the video objects generated before and after a pause operation.

5. Decoder Unit

Figure 10:
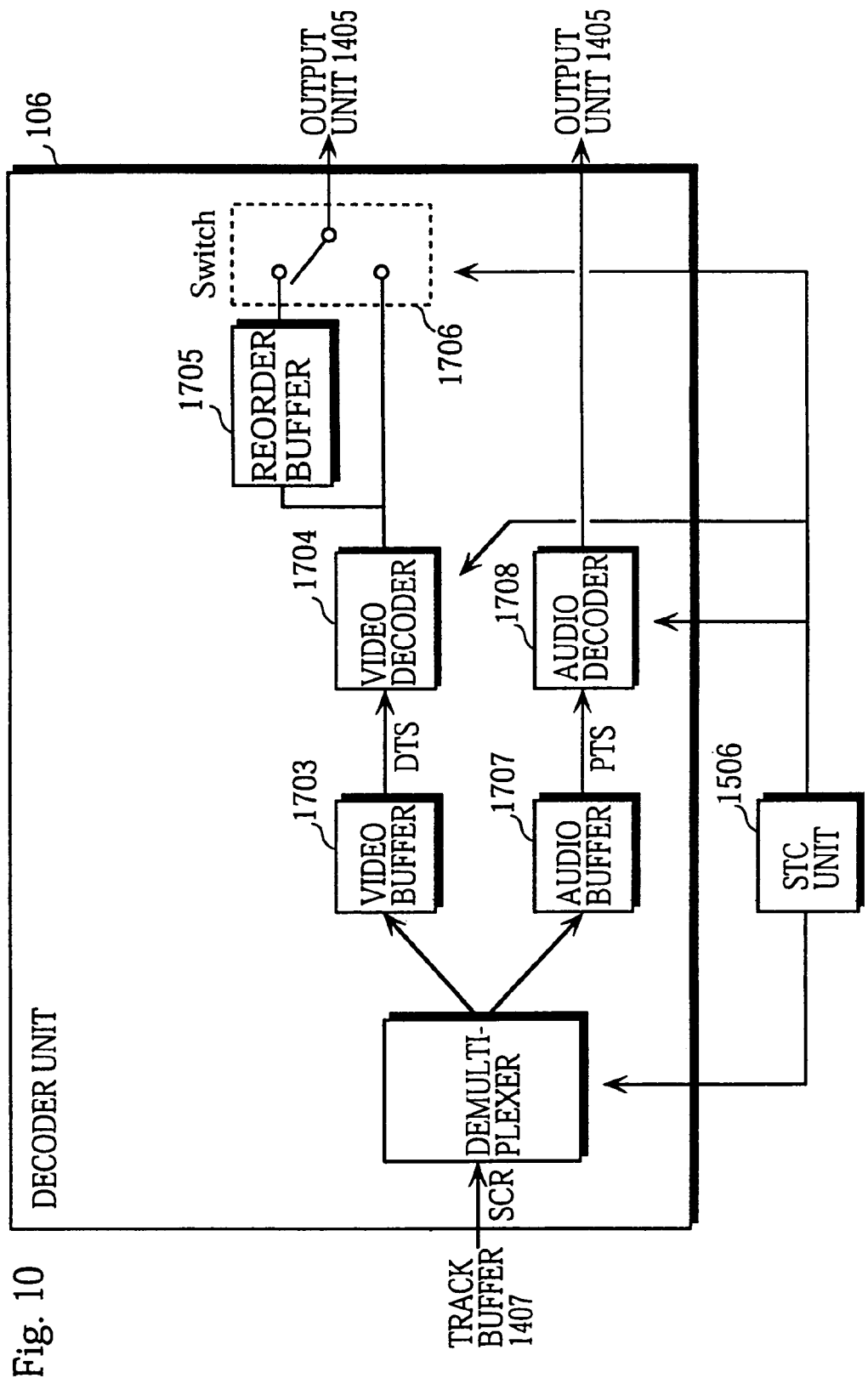
FIG. 10 is a block diagram showing the detailed construction of a decoder unit shown in FIG. 5.

FIG. 10 is a block diagram showing the detailed construction of the decoder unit 106 in FIG. 5. As shown in FIG. 10, the decoder unit 106 includes a demultiplexer 1702, a video buffer 1703, a video decoder 1704, a reorder buffer 1705, a switch 1706, an audio buffer 1707, an audio decoder 1708, and a control information output unit 1709.

The demultiplexer 1702 receives VOBs from the track buffer 1407 during reproduction. Then the demultiplexer 1702 sequentially stores the payload (i.e. packet) of each pack in the VOBs into the video buffer 1703 or audio buffer 1707 in accordance with the type of the pack. The storing of the payload of each pack into the video buffer 1703 or audio buffer 1707 is performed when the STC matches the SCR in the pack.

The video decoder 1704 fetches packets from the video buffer 1703 and decodes the packets. The fetching of packets is performed when the STC matches the DTS written in the first packet in the video buffer 1703 (or PTS in the case of audio packets).

The reorder buffer 1705 is a buffer used to change the output order of pictures in decoded data from a coding order to a display order.

The switch 1706 outputs decoded data sent from the video decoder 1704 and the reorder buffer 1705 to the output unit 1405 in picture units. This output operation is performed when the STC matches the PTC written in a packet.

The audio decoder 1708 fetches packets from the audio buffer 1707 and decodes the packets. The fetching of packets is performed when the STC matches the PTS written in the first packet in the audio buffer 1707. The decoded packets are instantly outputted to the output unit 1405.

<5.1 Reproduction Operation>

On receiving a reproduction start designation, the system control unit 102 refers to the PGCI shown in FIG. 4 and controls the decoder unit 106 to reproduce video objects specified by cell information. If the PGCI specifies the entire section of VOB#1 and the entire section of VOB#2 as a reproduction route in this order, for instance, the system control unit 102 controls the decoder unit 106 to reproduce the VOB#1 and then controls the decoder unit 106 to reproduce the VOB#2 immediately before the reproduction of the VOB#1 is completed.

Before controlling the decoder unit 106 to perform reproduction, the system control unit 102 refers to the VOBI corresponding to the video object that should be reproduced. If the seamless flag included in the VOBI is set as "0", the system control unit 102 initializes the decoder unit 106 and controls the decoder unit 106 to start the reproduction operation. If the seamless flag included in the VOBI is set as "0" and another video object is currently reproduced, the system control unit 102 does not initialize the decoder unit 106 and controls the decoder unit 106 to start the reproduction operation. The initialization of the decoder unit 106 means that the video buffer 1703, audio buffer 1707, and reorder buffer 1705 are reset.

If the seamless flag is set as "1", the system control unit 102 controls the decoder unit 106 to start the reproduction of a current video object and supply a video object to be subsequently reproduced without resetting the buffers described above after completing the inputting of the current video object. This allows the decoder unit 106 to seamlessly reproduce video objects even at boundaries between video objects.

The above example concerns normal reproduction (reproduction at normal speed). In the case of special reproduction, such as forward quick reproduction and reverse quick reproduction, the system control unit 102 controls the decoder unit 106 to partially reproduce each VOBU (for instance, reproduce only the I picture in each VOBU) to achieve the special reproduction. In this case, the seamless information corresponding to the seamless flag set as "1" is used during the special reproduction. If reverse quick reproduction is performed for instance, the last SCR of the immediately preceding VOB is referred to and the STC of the decoder unit 106 is changed before the immediately preceding VOB is read.

6. Modifications

The above embodiment takes a stationary optical disc recording and reproduction apparatus as an example. However, the optical disc recording and reproduction apparatus may be a portable video camera (camcorder). In this case, the optical disc recording and reproduction apparatus includes a microphone and camera as the input unit 103 and includes a small liquid crystal panel and a small speaker as the output unit 105.

Although the above embodiment takes a DVD-RAM as an example of the optical disc, the optical disc may be another type of rewritable optical disc. Also, data may be recorded onto a hard disc instead of an optical disc.

In the operation example shown in FIG. 9, the audio encoder 1503 suspends the encoding operation with the audio data f4 and f51 remaining in the internal audio input buffer. However, the audio encoder 1503 may suspend the encoding operation after encoding the audio data f4. In this case, after a pause operation is designated, only audio data piece f51, whose size is less than the size of one audio frame, remains in the audio input buffer, and the audio encoder buffer 1504 holds compressed audio data obtained by encoding the audio frame f4.

In the above embodiment, the audio encoder 1503 reduces the level of audio data having no correlation in an audio frame (for instance, f51 and f52 in FIG. 9) generated by a pause operation by replacing at least one of audio data pieces before and after the pause operation with silent data before encoding. However, a mute circuit may be provided between the input unit 103 and audio encoder 1503. In this case, the mute circuit mutes the first short section (shorter than one audio frame and, for instance, of several milliseconds) of audio data generated immediately after a pause release designation, that is, inputs silent data into the audio encoder 1503 for the first short section. This allows the audio frame divided by a pause operation to be reproduced without causing noise (electric noise).

Also, the mute circuit may be provided to mute the last short section of audio data generated immediately before a pause operation. Furthermore, the mute circuit may mute both of (1) the first short section of audio data generated immediately after a pause release designation and (2) the last short section of audio data generated immediately before a pause operation.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A processing apparatus for use with an optical disc recording apparatus having a receiving unit operable to receive designations from a user, the designations including a recording start designation, a recording end designation, a pause designation, and a pause release designation, the processing apparatus comprising:

an encoding unit operable to generate one video object by compressing audio and video data for a period starting when the receiving unit receives the recording start designation or the pause release designation and ending when the receiving unit receives the pause designation or the recording end designation, wherein if the receiving unit receives the pause release designation, a video object is generated so that the video object is capable of being seamlessly reproduced with an immediately preceding video object in a reproduction apparatus; and a generation unit operable to generate a seamless flag each time a video object is generated, the seamless flag showing whether the video object corresponding to the seamless flag is capable of being seamlessly reproduced with an immediately preceding video object in the reproduction apparatus, wherein the recording apparatus further includes a recording unit operable to record, onto an optical disc, each video object generated by the encoding unit and each seamless flag generated by the generation unit, wherein if the receiving unit receives the pause designation, the encoding unit completes a generation of a current video object and preserves an internal state of the encoding unit at a point when the generation of the current video object is completed, wherein if the receiving unit receives the pause release designation, the encoding unit starts a generation of a new video object using the preserved internal state as an initial state, wherein the internal state preserved in the encoding unit includes (a) compressed audio data that is not yet multiplexed into a video object and remains in an audio buffer at the point and (b) a virtual buffer size obtained by simulating a size of data that would be held in a compressed video data buffer of the reproduction apparatus at the point, wherein if the encoding unit completes the generation of the current video object because of the pause designation, the generation unit generates a seamless flag showing that the current video object is capable of being seamlessly reproduced, and wherein if the encoding unit completes the generation of the current video object because of the recording end designation, the generation unit generates a seamless flag not showing that the current video object is capable of being seamlessly reproduced.

2. The processing apparatus of claim 1, wherein the encoding unit replaces one of a last section of audio data immediately before the pause designation and a start section of audio data immediately after the pause release designation with silent data, each of the last section and the start section being shorter than one audio frame.

3. The processing apparatus of claim 1, wherein the encoding unit includes:

a first encoder operable to sequentially compress video data;

a first buffer operable to temporarily hold the compressed video data;

a second encoder operable to sequentially compress audio data;

a second buffer operable to temporarily hold the compressed audio data;

a multiplexing unit operable to generate one video object by multiplexing the compressed video data from the first buffer and the compressed audio data from the second buffer into packs of a fixed length, wherein a piece of time information is given to each pack during multiplexing, the piece of time information showing a time at which the reproduction apparatus should separate compressed video data or compressed audio data in the pack from the video object;

a first virtual buffer unit operable to simulate a size of data in a video buffer of the reproduction apparatus according to the piece of time information given to each pack, wherein the video buffer is used to temporarily hold the separated compressed video data;

a second virtual buffer unit operable to simulate a size of data in an audio buffer of the reproduction apparatus according to the piece of time information given to each pack, wherein the audio buffer is used to temporarily hold the separated compressed audio data; and an encoding control unit operable to (a) have the first encoder and the second encoder suspend operations, and preserve current states of the first and second buffers and the first and second virtual buffer units if the receiving unit receives the pause designation and (b) have the first encoder and the second encoder resume the operations using the preserved states as initial states to generate a video object, whose seamless reproduction is possible in the reproduction apparatus, if the receiving unit receives the pause release designation.

4. The processing apparatus of claim 3, wherein the second encoding unit replaces one of a last section of audio data immediately before the pause designation and a start section of audio data immediately after the pause release designation with silent data, each of the last section and the start section being shorter than one audio frame.

5. A processing apparatus for use with an optical disc recording apparatus having a receiving unit operable to receive designations from a user, the designations including a recording start designation, a recording end designation, a pause designation, and a pause release designation, the processing apparatus comprising:

an encoding unit operable to generate one video object by compressing audio and video data for a period starting when the receiving unit receives the recording start designation or the pause release designation and ending when the receiving unit receives the pause designation or the recording end designation, wherein if the receiving unit receives the pause release designation, a video object is generated so that the video object is capable of being seamlessly reproduced with an immediately preceding video object in a reproduction apparatus; and a generation unit operable to generate a seamless flag each time a video object is generated, the seamless flag showing whether the video object corresponding to the seamless flag is capable of being seamlessly reproduced with an immediately preceding video object in the reproduction apparatus, wherein the recording apparatus further includes a recording unit operable to record, onto an optical disc, each video object generated by the encoding unit and each seamless flag generated by the generation unit, wherein if the receiving unit receives the pause designation, the encoding unit completes a generation of a current video object and preserves an internal state of the encoding unit at a point when the generation of the current video object is completed, wherein if the receiving unit receives the pause release designation, the encoding unit starts a generation of a new video object using the preserved internal state as an initial state, wherein if the encoding unit completes the generation of the current video object because of the pause designation, the generation unit generates a seamless flag showing that the current video object is capable of being seamlessly reproduced, wherein if the encoding unit completes the generation of the current video object because of the recording end designation, the generation unit generates a seamless flag not showing that the current video object is capable of being seamlessly reproduced, wherein the encoding unit includes a mute circuit operable to replace inputted audio data with silent data, and wherein the encoding unit has the mute circuit operate for one of a last section of audio data immediately before the pause designation and a start section of audio data immediately after the pause release designation, each of the last section and the start section being shorter than one audio frame.

* * * * *